United States Patent
Thompson (10) Patent No.: US 7,841,659 B2
(45) Date of Patent: *Nov. 30, 2010

(54) SEATING FOR A VEHICLE

(75) Inventor: James Thompson, Kilkeel (GB)

(73) Assignee: J. Thompson Solutions Limited, Kilkeel, County Down (GB)

( * ) Notice: Subject to any disclaimer, the term of this patent is extended or adjusted under 35 U.S.C. 154(b) by 569 days.

This patent is subject to a terminal disclaimer.

(21) Appl. No.: 11/771,281

(22) Filed: Jun. 29, 2007

(65) Prior Publication Data

US 2007/0295863 A1    Dec. 27, 2007

Related U.S. Application Data

(63) Continuation of application No. 10/516,807, filed on Jun. 10, 2005, now Pat. No. 7,252,332.

(30) Foreign Application Priority Data

Apr. 19, 2002  (GB) .................................. 0208917.5
Dec. 20, 2002  (GB) .................................. 0130442.7

(51) Int. Cl.
  *A47C 15/00*  (2006.01)
  *A47C 7/72*   (2006.01)
(52) U.S. Cl. .................... 297/248; 297/232; 297/217.3; 297/217.4
(58) Field of Classification Search ................. 297/232, 297/248, 217.3, 217.4
See application file for complete search history.

(56) References Cited

U.S. PATENT DOCUMENTS

| | | | | |
|---|---|---|---|---|
| 797,826 A | * | 8/1905 | Sherman, Jr. ............ | 297/232 X |
| 1,039,780 A | * | 10/1912 | Morgan ................... | 297/232 X |
| 1,087,540 A | * | 2/1914 | Kennedy ................ | 297/232 X |
| 2,839,312 A | * | 6/1958 | Barenyi et al. ............. | 280/775 |
| 2,947,349 A | * | 8/1960 | Kryter .................... | 297/174 R |
| 3,541,742 A | * | 11/1970 | Harper ................... | 297/232 X |
| 4,036,527 A | * | 7/1977 | Faul ....................... | 297/232 X |
| 4,382,628 A | * | 5/1983 | Palmgren .................... | 297/232 |
| 5,083,838 A | * | 1/1992 | Maxwell, Jr. ........... | 297/232 X |
| 5,163,733 A | * | 11/1992 | Maxwell ................. | 297/232 X |
| 6,012,679 A | * | 1/2000 | Auestad .................. | 297/232 X |
| 2004/0051354 A1 | * | 3/2004 | Bouchard et al. ........... | 297/232 |
| 2008/0224510 A1 | * | 9/2008 | Hankinson et al. .......... | 297/248 |

* cited by examiner

*Primary Examiner*—Rodney B White
(74) *Attorney, Agent, or Firm*—Porter, Wright, Morris & Arthur, LLP (57) ABSTRACT

A seating arrangement for a vehicle, especially an aircraft, in which seats are arranged in a plurality of generally parallel ranks, each rank extending in a fore-and-aft direction, and in a plurality of rows, each row extending at an angle other than a right angle with respect to said fore-and-aft direction and wherein adjacent seats in a row overlap in a transverse direction. In the preferred embodiment, the seats of a row also overlap in said fore-and-aft direction and include a truncated armrest at one side of the seat arranged to fit behind an adjacent seat. The seats further include an armrest at the other side of the seat, the armrest comprising a bar which extends from the rear of the seat so that a portion of one seat is located beneath the armrest provided at said other side of an adjacent seat.

23 Claims, 7 Drawing Sheets

SEATING FOR A VEHICLE

CROSS-REFERENCE TO RELATED APPLICATIONS

This application is a continuation of U.S. patent application Ser. No. 10/516,807 filed on Jun. 10, 2005, now U.S. Pat. No. 7,252,332, the disclosure of which is expressly incorporated herein in its entirety by reference.

FIELD OF THE INVENTION

This invention relates to seating for a passenger conveyance. It has particular, but not exclusive, application to seating in a passenger carrying aircraft.

BACKGROUND OF THE INVENTION

There are clear economic incentives that drive aircraft designers to provide as many seats as possible in a passenger aircraft. However, of late, concerns have been raised about potential health effects upon passengers who are forced to sit for an extended period in a seat that allows its occupant little room for movement. While this problem could be addressed by offering passengers more legroom, this would reduce the carrying capacity of the aircraft, and, in consequence, its revenue earning ability. At present, the extent to which reduced air pressure in an aircraft cabin contributes to observed health effects is not known. However, there is concern that corresponding effects might occur in similarly cramped seating in other circumstances, for example, in other form of transport such as aircraft, ships, hydrofoils, trains and coaches and so forth, as well as in other circumstances not related to transport.

Therefore, it would be desirable to provide a seating arrangement that can be used in passenger aircraft and in other circumstances that can provide an occupant of the seats with additional space while having a minimal effect on seating capacity, as compared with conventional seating arrangements.

SUMMARY OF THE INVENTION

Accordingly, from a first aspect, this invention provides a seating arrangement for a vehicle, the seating arrangement comprising seats arranged in a plurality of generally parallel ranks, each rank extending in a first direction, and in a plurality of rows, each row extending at an angle other than a right angle with respect to said first direction and wherein adjacent seats in a row overlap in a second direction, the second direction being substantially perpendicular to said first direction.

This arrangement, at its most general, can offer greater flexibility in arranging the seats in an optimal arrangement than can the conventional arrangement in which ranks and rows are at right angles to one another.

Preferably, the angle between the rows and said first direction is between 40° and 80°, preferably between 50° and 70° and more preferably approximately 60° to 62°.

Each seat most typically has a maximum fore-and-aft dimension and a maximum transverse dimension. In typical embodiments of the invention, the rows are spaced apart at a pitch distance than is less than the maximum transverse direction. This means, in effect, that adjacent seats in a row overlap one another in a transverse direction when viewed in a direction along the ranks.

Preferably, the seats in a row overlap in said first direction. More preferably, at least some of the seats in a row include a truncated armrest at one side of the seat arranged to fit behind an adjacent seat. Further preferably, the truncated armrest is arranged to substantially abut with the rear of an adjacent seat.

Preferably, at least some of the seats in a row include an armrest at the other side of the seat, the armrest comprising a bar which extends from the rear of the seat. More preferably, a portion of one seat is located beneath the armrest provided at said other side of an adjacent seat. Preferably, the amount of overlap of adjacent seats in said second direction is approximately equal to the combined widths, in said second direction, of the truncated armrest and the armrest on the other side of the seat.

In a preferred embodiment, the ranks are arranged in groups and at least some of the groups that are adjacent in said first direction are arranged such that their respective rows are disposed at supplementary angles with respect to said first direction thereby defining a substantially triangular space between said at least some adjacent groups.

Preferably, a walled compartment is provided in a space defined between said adjacent groups. More preferably, said compartment is substantially triangular in shape and comprises a toilet located substantially at a apex of the compartment.

In a particularly preferred embodiment, each seat has a back and a base, in which at least the back of the seat can be moved from a relatively upright position to a relatively reclined position, in which movement of the seat from the upright to the reclined position involves forward movement of the seat base such that the back of the seat does not move in a rearwards direction at a level below the armrest of the seat. Preferably, during movement of the seat from the upright to the reclined position, the back of the seat is arranged to pivot about an axis extending in said second direction at a level at or above the level of the armrest of the seat.

A second aspect of the invention comprises an aircraft seating arrangement comprising the seating arrangement according to the first aspect of the invention.

A third aspect of the invention provides a passenger conveyance comprising a seating arrangement according to the first aspect of the invention.

It has been found that the arrangement defined in the first aspect of the invention can be further enhanced by use of a seat of particular design, as will be discussed below. However, it should be noted that application of the arrangement of the first aspect of the invention is not restricted to use with such seats, and that the seats can be used in other arrangements.

From a fourth aspect, this invention provides a seat for use in a passenger conveyance, the seat having a back and a base, in which at least the back of the seat can be moved from a relatively upright position to a relatively reclined position, in which movement of the seat from the upright to the reclined position does not cause the back of the seat to move in a rearwards direction at a level below the armrest of the seat. This ensures that the seat back does not interfere with the arms of a seat immediately to the rear.

A seat embodying this aspect of the invention is preferably constructed such that it has armrests that maintain a constant position with respect to a passenger in the seat as the seat moves between its upright and its reclined position.

A seat embodying this aspect of the invention may include a carrier for articles mounted on the rear of the seat back, and accessible to a person in a seat to the rear. The seat back may also carry a support for apparatus, such as a display monitor, that can be used by a person occupying the seat.

Other advantageous aspects of the invention will become apparent to those ordinarily skilled in the art upon review of the following description and with reference to the accompanying drawings.

BRIEF DESCRIPTION OF THE DRAWINGS

Embodiments of the invention will now be described in detail, by way of example, and with reference to the accompanying drawings, in which.

DETAILED DESCRIPTION OF CERTAIN PREFERRED EMBODIMENTS

Figure 1:
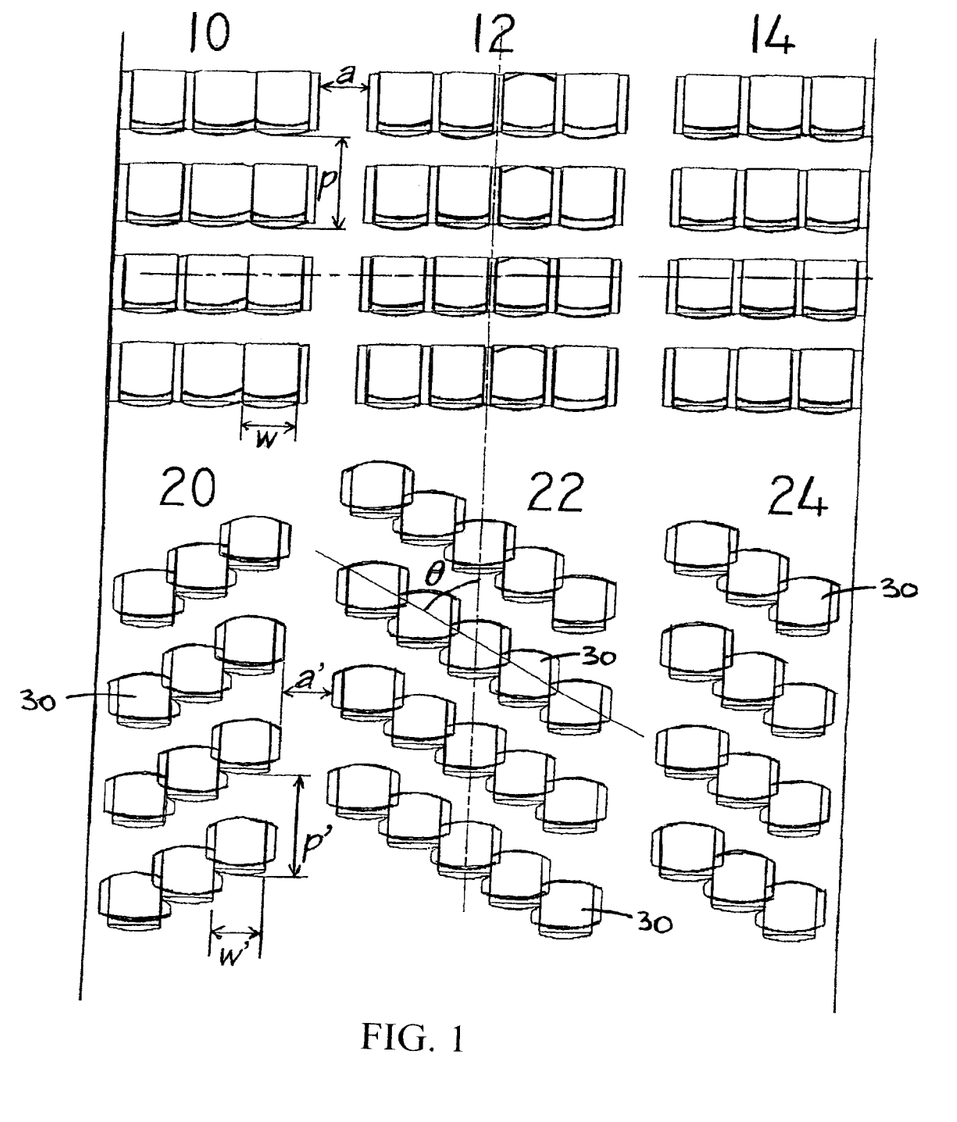
FIG. 1 is a seating layout plan of a passenger aircraft showing seats disposed in a conventional layout and in a layout embodying the invention.

FIG. 1 shows seating layouts suitable for installation in a passenger aircraft (not shown). A typical seating arrangement of a Boeing 747 aircraft for economy class seats, as shown in the upper part of FIG. 1, is designated 3:4:3, this indicating that the seats are arranged in groups of 3 ranks on the left of the aircraft, 4 ranks in the middle and 3 on the right, shown respectively at 10, 12 and 14 in FIG. 1. Each rank extends in a first direction, usually longitudinally of the aircraft, and within the ranks, the seats are arranged in rows that extend at a right angle to the ranks, across the aircraft.

In this seating arrangement, the seat base width w might typically be 457 mm. The aisle width a might be 406 mm and the pitch p might typically be 813 mm. The pitch is defined as the distance in a fore-and-aft direction between a specific point on one seat and the same specific point in the seat immediately in front or behind.

A seating arrangement embodying the invention is shown in the lower part of FIG. 1, in this case, with a 3:5:3 arrangement at 20, 22 and 24 respectively (alternative arrangements embodying the invention might be arranged in a 4:4:4 or a 3:6:3 abreast configuration.) The illustrated embodiment comprises seats 30, each of which has a seat base width w' of approximately 457 mm or 483 mm and an aisle width a' of approximately 406 mm. The preferred pitch p' in this embodiment is approximately 914 mm. This is an increase over the conventional arrangement to ensure compliance with relevant regulations defining entry and exit access. However, given the increase in the number of seats across the aircraft, the total number of seats that can be installed in a given space on the aircraft is not substantially reduced, thereby ensuring that installation of seating of this embodiment does not reduce the capacity of the aircraft.

Comparing the conventional arrangement, and the arrangement embodying the invention as described above, the following can be concluded. First, the seat pitch has been increased. This distance is of critical importance in giving a perception of space from the point of view of the passenger. It is also possible to provide a passenger with additional room for a passenger's arms, giving each passenger armrests to which they one passenger alone has access. Second, from the point of view of the aircraft operator, it is possible to offer additional benefits to passengers without incurring reduced capacity (and therefore reduced revenue) in operating their aircraft. The passenger can be offered a greater seat pitch without or with minimum loss to capacity, or the operator can offer the passenger a wider seat while maintaining the same number of seats across the aircraft. Alternatively still, if the pitch and or seat width is kept the same as for conventional seating arrangements, an arrangement embodying the invention allows more seats to be fitted into a given cabin area. As will be seen from the following descriptions, any gaps formed between groups of seats in an arrangement embodying the invention and, say, a bulkhead or other seat groups, may conveniently be filled with stowage compartments, one or more passenger seats, one or more seats for cabin crew, a lavatory or other compartment.

In this embodiment, the ranks of seats are each arranged on a respective axis that is generally parallel with the longitudinal axis of the aircraft (this is the fore-and-aft direction for a seated passenger). The rows of seats are arranged at an angle θ from the longitudinal axis, where preferably θ≈62°. Within each of the groups 20, 22, 24 of ranks, the rows are substantially parallel to one another. It may also be the case that the rows of two or more groups are also substantially parallel (as in the case of groups 22 and 24) or they may be at a similar angle but at opposite directions (i.e. a supplementary angle) from the longitudinal axis (as in the case of groups 20 and 22). Normally, the seats 30 face forwardly of the aircraft, i.e. in the normal direction of travel, although the seats 30 may alternatively face rearwardly. One advantage of rearward facing seats is that, during certain emergency manoeuvres or incidents which would normally throw a passenger's head forwardly of the aircraft, the head is thrown backwards with respect to the direction in which the passenger is facing and is therefore supported by the seat's headrest. Hereinafter, unless otherwise stated the terms "forward", "front", "rearward", "rear" and the like are used with respect to a seated passenger, who is assumed to face "forwardly".

Figure 4:
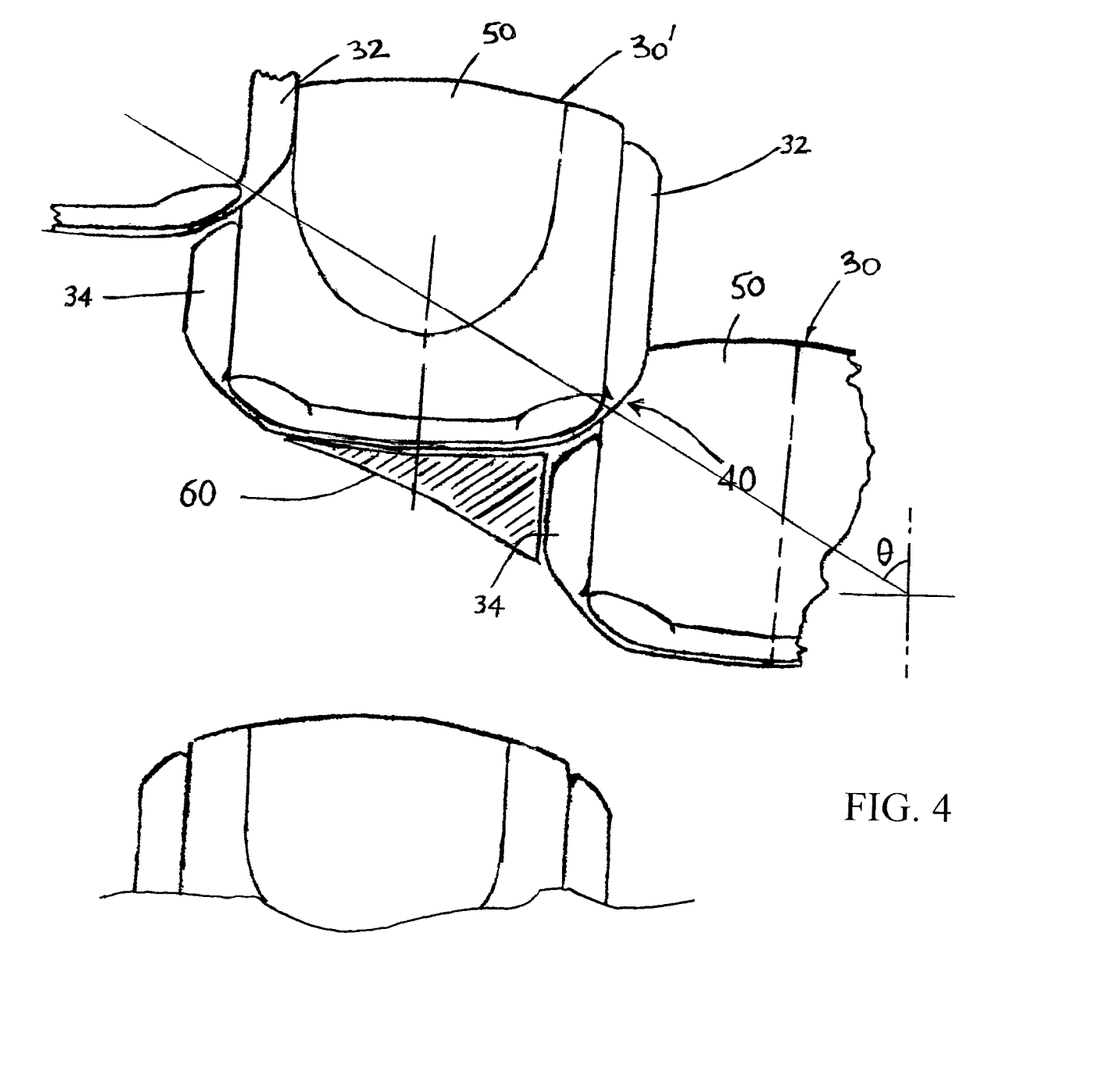
FIG. 4 is an enlarged plan view of a group of seats arranged in accordance with the layout of FIG. 1 which embodies the invention.

Within each row, adjacent seats 30 are displaced, or staggered, with respect to one another in the longitudinal direction to form a row which is obliquely disposed with respect to the longitudinal axis of the aircraft. In the preferred embodiment, adjacent seats 30 overlap in the longitudinal, or fore-and-aft direction. Moreover, adjacent seats 30 in each row overlap one another in a second, or transverse, direction. In FIG. 4 there is shown part of a row that disposed at an angle θ with respect to the longitudinal axis of the aircraft. In such a row, each seat 30 has a seat base 50 and first, or right-hand (from a seated passenger's perspective) armrest 32 that extends substantially the full fore-and-aft length of the seat 30. Such an armrest 32 is essentially conventional in its configuration. On the other (i.e. left-hand, from the seated passenger's perspective) side of the seat 30, a second, truncated, armrest 34 is provided that extends from the rear of the seat 30 substantially to the rear of the seat 30' immediately to the left and to the front (and may, in the preferred embodiment abut against the rear of the seat 30 in front). It will be seen that a passenger occupying the seat has exclusive access to each of the armrests 32, 34, neither armrest being shared with an occupier of adjacent seat 30. One particular advantage of this arrangement is that it allows the seat occupier to make adjustments to his own armrests 32, 34, and so optimise his own comfort, without bothering an adjacent passenger. In the preferred embodiment, therefore, one or both of the armrests 32, 34 of each seat 30 is mounted to the respective seat 30 by a conventional height adjustable mechanism (not shown) such that the height of the, or each, armrest 32, 24 is height adjustable.

In the preferred embodiment, the armrests of adjacent seats overlap. It is particularly preferred that adjacent seats overlap by an amount at least approximately equal to the width of the armrests 32, 34 measured in the transverse direction, and more preferably by approximately the combined widths of both armrests 32, 34, as may best be seen from FIG. 4. It will be seen from FIG. 4 that the right armrest 32 of one seat 30' overlaps with the left armrest 34 of an adjacent seat 30 in the transverse direction. This is made possible by the staggering of seats 30 described above. As a result, for a defined amount of space in the transverse direction, more seats 30 can be fitted into the defined space than is possible with conventional seating arrangements. Alternatively, the arrangement allows wider seats 30 (i.e. seats with a wider base 50 in the transverse direction) to be fitted into the defined space than is possible with conventional seating arrangements. The former increases the seating capacity for a defined space and therefore increases potential revenue for the aircraft operator, while the latter offers increased comfort to passengers. An aircraft operator can select the more appropriate option depending on its needs.

Figure 2:
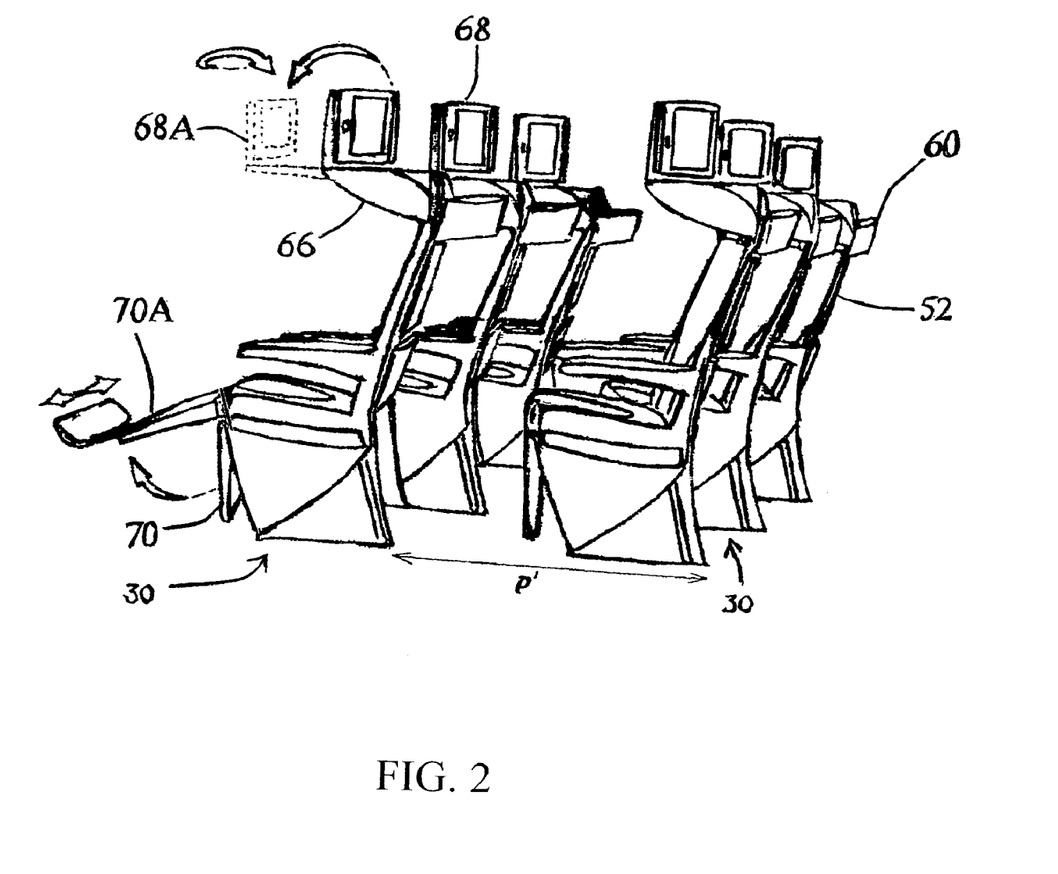
FIG. 2 is a side view of a group of ranks of seats in an aircraft arranged in accordance with the layout of FIG. 1 which embodies the invention.

As may be seen from FIG. 2, in the preferred embodiment the seat armrests 32, 34 comprise an elongate member projecting from the back of the respective seat 30, thereby defining a gap beneath the armrest 32, 34. As a result, a front part of the seat base 50 of one seat 30 may fit beneath the armrest 32 of a forward and adjacent seat 30', as indicated at 40 (FIG. 4). This enables a greater degree of overlap of adjacent seats 30, 30' in a transverse direction, so increasing the seating capacity that can be provided in a given area (without compromising the effective size of the seat base).

Moreover, this arrangement allows a reduction in the amount of relative displacement between adjacent seats 30, 30' in the fore-and-aft direction (i.e. increases the possible overlap in the fore-and-aft direction) that is required to stagger seats in the manner described herein, which in turn reduces the amount of space occupied by a row in the fore-and-aft direction. In a particularly preferred embodiment, the arrangement is such that the, or each armrest 32, 34 of a seat 30 in a given row abuts with the back of a forwardly displaced seat 30' in that row, or is at least as close a possible (i.e. substantially abuts) to the back of a fully reclined forwardly displaced seat 30'. It is assumed in this example that the seats 30 are of the general type in which the seat base 50 moves forward in order to recline the seat 30, rather than the seat back moving backwards. It will be understood that adjacent seats 30 may be staggered in the general manner described above without the base 50 of one seat 30 being partly disposed beneath the armrest 32, 34 of an adjacent seat. It is nonetheless preferred to provide a gap beneath the armrests 32, 34 as this creates additional leg room for a passenger seated in an adjacent, rearwardly disposed seat. Clearly, armrests of the type described above are not required at free sides of seats, i.e. sides that are not adjacent another seat.

In an alternative embodiment (not illustrated), it is possible to form a cut away region at a front part of the seat base to fit against a rear part of an adjacent seat, although this narrows the seat base in this region.

A consequence of the arrangement of this embodiment is that the position of the armrests 32, 34 of any seat can be optimised for the occupant of that seat alone. It is not necessary to compromise the position of the armrest to accommodate the requirements of two people sharing the same armrest. However, it is also important that the back of one seat does not recline into the armrest of the seat behind. This may be achieved, as indicated above, by using seats of the general type which recline by forward movement of the seat base, or by arranging the length of the truncated armrest 34 to allow rearward movement of the back of the forward adjacent seat. Alternatively still, a preferred seat 30 may be employed as is now described with reference to FIG. 5.

Figure 5:
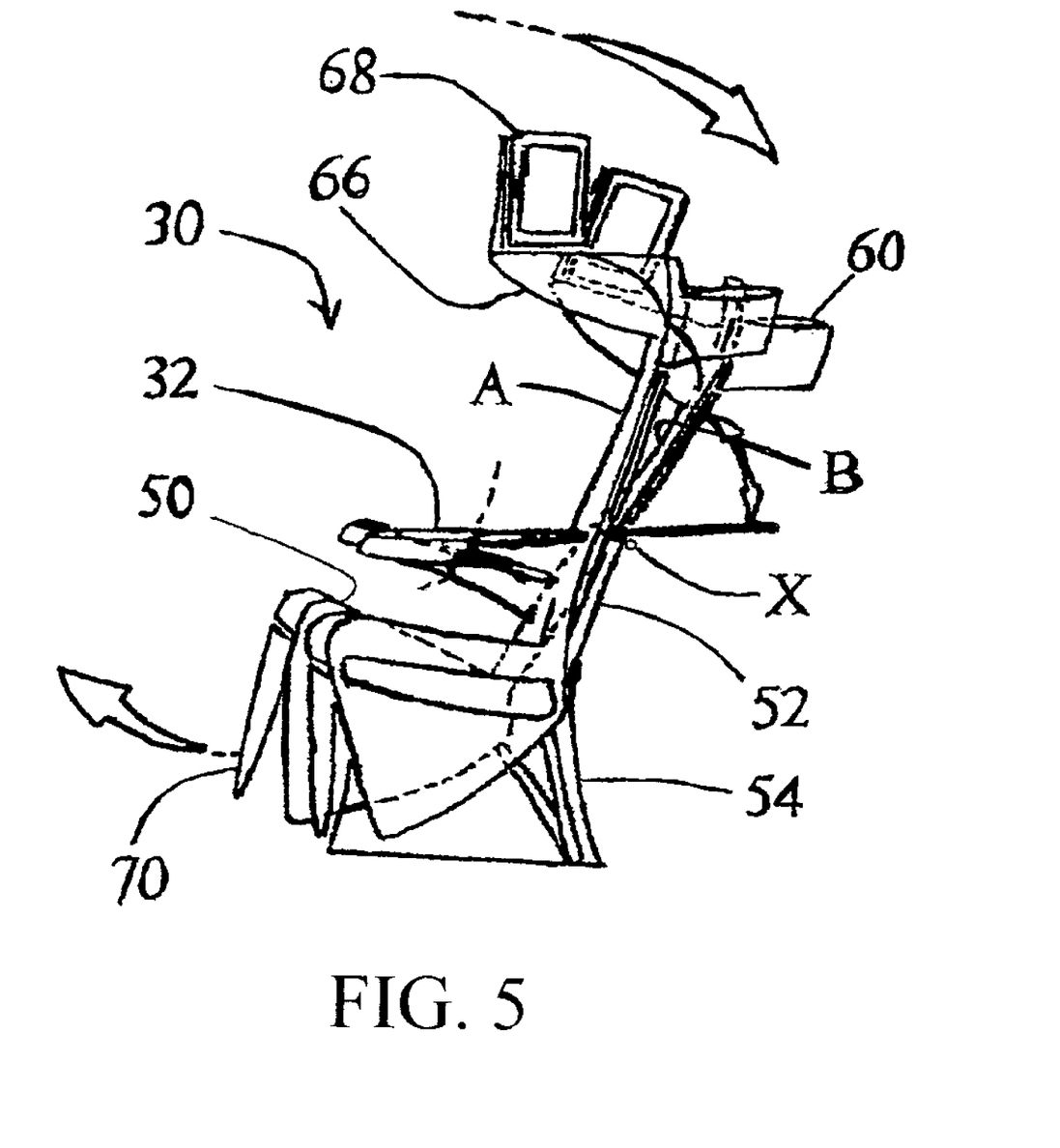
FIG. 5 is a side view of a seat that is suitable for installation in the arrangement of FIG. 1, illustrating the seat's reclining action.

The preferred seat 30 of FIG. 5 comprises a seat base 50 and a seat back 52 supported on a frame 54. The seat has an upright position, shown at outline A in FIG. 5 and a reclined position shown at outline B in FIG. 5. As the seat 30 moves between the upright and reclined positions, the back 52 pivots about an axis X which is substantially transverse of the aircraft at a height substantially the same height as the armrest of the seat 30 immediately to the rear. The seat armrests 32, 34 are connected to the seat back 52 so that the armrests move as the seat is reclined thereby maintaining a constant position with respect to a person who is occupying the seat.

The seat back 52 may be provided with a pocket 60 facing to the rear of the seat. This pocket 60 can be used by an occupant of a seat to the rear as a receptacle for storing articles. Such a pocket is particularly advantageous when the seat is installed in accordance with an installation that embodies the first aspect of the invention, because the additional seat pitch provides space in which the pocket 60 can be located.

Figure 3:
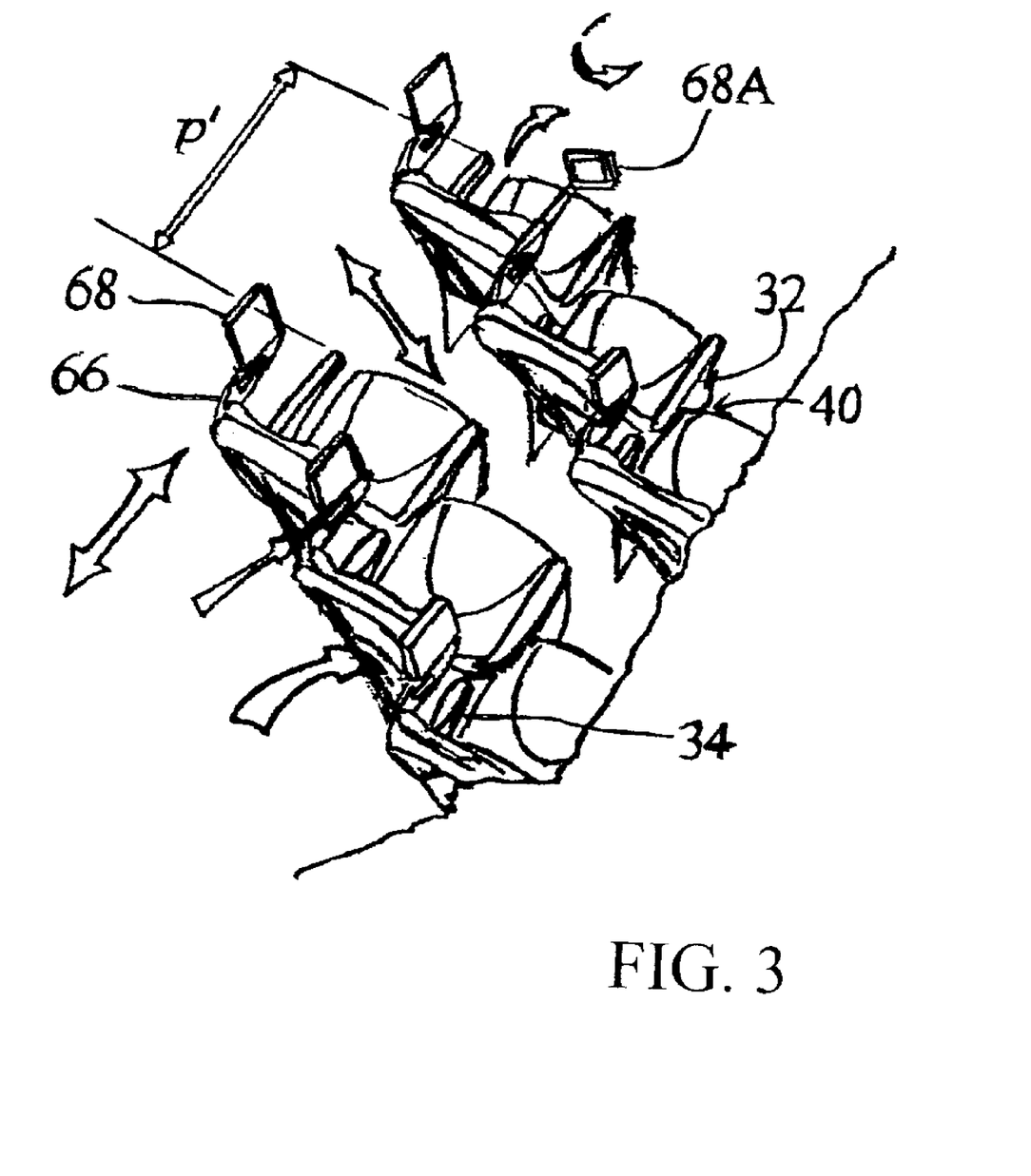
FIG. 3 is a view from above of a group of ranks of seats in an aircraft arranged in accordance with the layout of FIG. 1 which embodies the invention.

Preferably, the seat back 52 carries an arm 66 that carries a monitor 68. The arm 66 can be pivoted about an approximately, in use, vertical axis to move the monitor 68 from a stowed position in which it is to one side of the seat 30 and a position for use (shown at 68A in FIG. 3) in which the monitor is to forward of the occupant, within their line of sight. As can be seen in FIG. 5, the monitor 68 moves as the seat 30 is reclined to maintain a constant position with respect to the seat's occupant. This installation of the monitor 68 takes advantage of the arrangement of seats described above because it occupies a space that might inconvenience a person in an adjacent seat.

The additional seat pitch offered by the arrangement of the preferred embodiment permits an extensible footrest 70 to be mounted at the front of the seat base 50. The footrest 70 can be pivoted between a stored position and an extended position, shown at 70A (FIG. 2), for use. As with the arm 66, the footrest 70 moves with the seat as it reclines, thereby ensuring that it maintains its position with respect to the seat's occupant.

Figure 6:
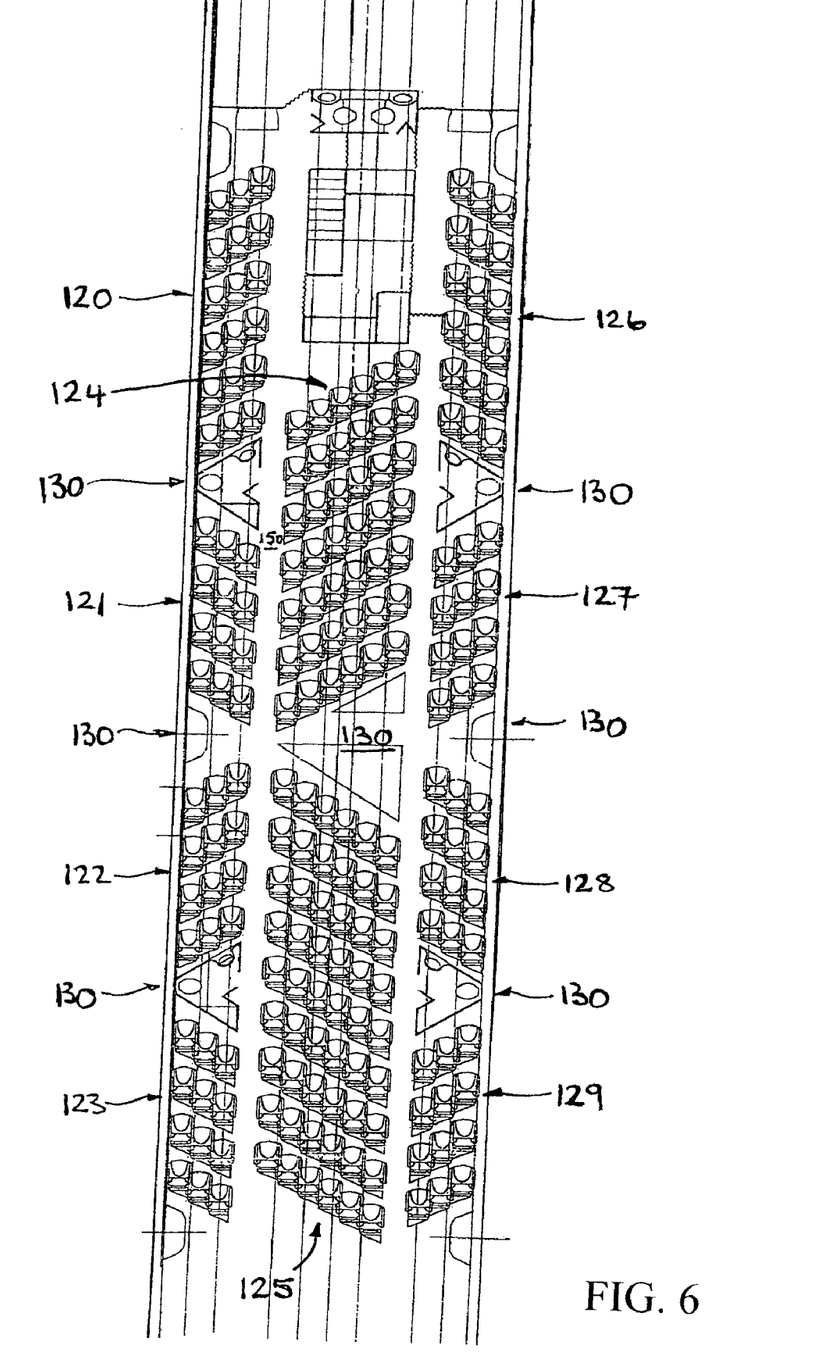
FIG. 6 is an alternative seating layout plan of a passenger aircraft showing seats disposed in an alternative layout embodying the invention.

FIG. 6 shows an alternative seating layout plan, comprising a seating arrangement embodying one aspect of the invention. The seating layout plan of FIG. 6 is illustrated in the context of a passenger aircraft, but is not limited to use with such. The seating arrangement of FIG. 6 is shown, by way of example only, in a 3:6:3 arrangement, having 3 ranks of seats on the left side (as viewed in FIG. 6), 6 ranks in the middle, and 3 ranks on the right side. The ranks are arranged in groups, indicated as 120, 121, 122, 123 on the left side, 124, 125 in the middle and 126, 127, 128, 129 on the right side of FIG. 6. Within each group 120-129, the rows of seats are arranged in a diagonal, or oblique, manner (with respect to the longitudinal axis of the aircraft) substantially as described with reference to FIGS. 1 to 5. However, at least some of the groups that are adjacent in a longitudinal, or fore-and-aft, direction—for example groups 120 and 121, groups 124 and 125, and groups 128 and 129—are arranged so that the respective rows of the adjacent groups are inclined in a substantially opposite, or supplementary, direction with respect to the longitudinal axis of the aircraft. Hence, the respective rows in groups that are adjacent in a fore-and-aft direction diverge or converge with respect to the transverse axis of the aircraft. It is preferred that the rows of one group are arranged on an axis that is inclined from the longitudinal axis at an angle which is substantially supplementary to the angle at which the rows of the adjacent group are inclined. Hence, adjacent groups are effectively a mirror image of each other with respect to the transverse axis. The preferred acute angle with respect to the longitudinal axis is θ≈62°, as described with respect to FIGS. 1-5.

Figure 7:
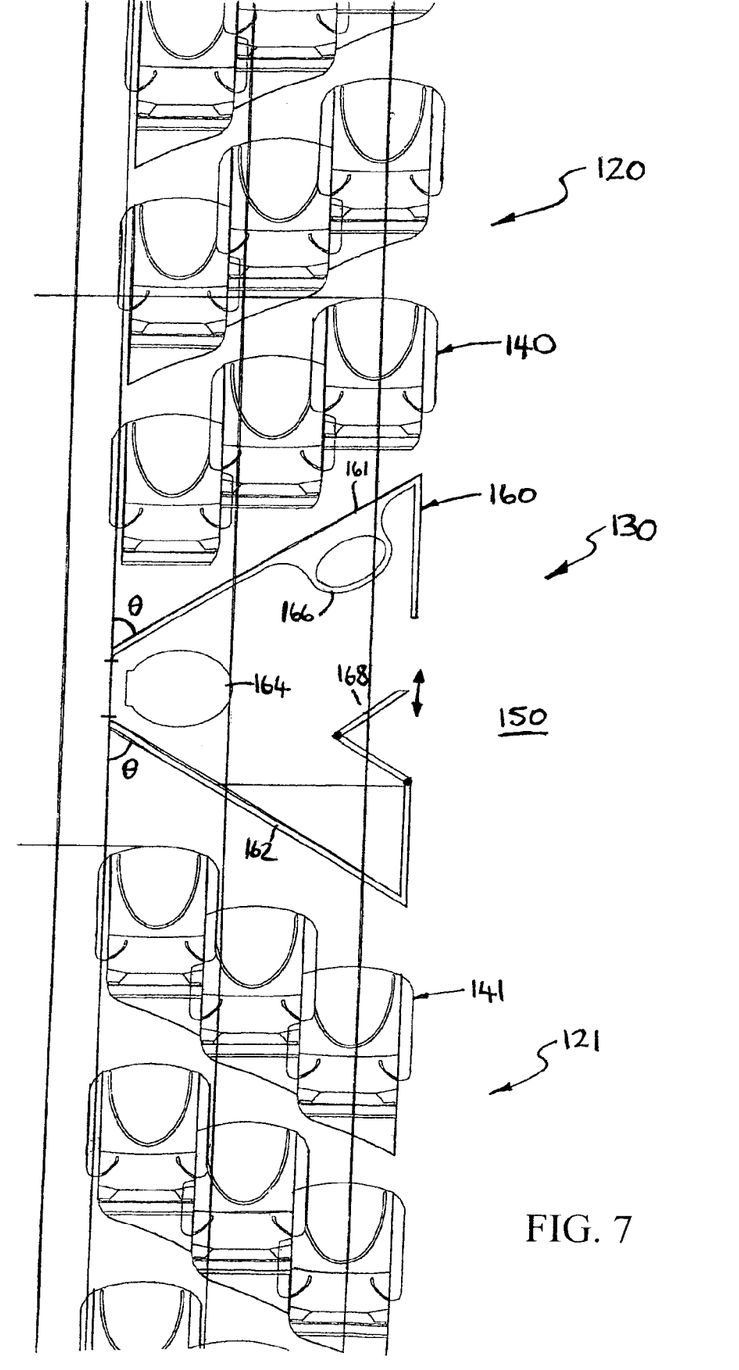
FIG. 7 is an enlarged view of a portion of the seating layout plan of FIG. 6.

It will be seen from FIG. 6 that at the interface regions 130 between adjacent groups, the respective end row of each group together define a substantially triangular, or V-shaped, space, the advantages of which can be appreciated by considering FIG. 7 which shows an enlarged view of the interface region 130 between adjacent seating groups 120, 121.

In FIG. 7, the respective end rows 140, 141 of seating groups 120, 121 diverge with respect to the transverse axis of the aircraft in a direction towards an aisle 150, thereby defining a substantially triangular, or V-shaped space 130. A walled enclosure or compartment 160 is provided in the space 130. The walled compartment 160 is substantially triangular, or V-shaped, in plan cross-section such that it substantially matches the shape and size of the space 130. Preferably the side walls 161, 162 of the compartment 160 are inclined at an angle θ≈62° with respect to the longitudinal axis, as shown in FIG. 7. Conveniently, the compartment 160 is provided with a conventional double hinged door 168. The compartment 160 is particularly suited for use as a lavatory, or washroom, comprising a toilet 164 and normally at wash-basin 166. It is particularly preferred that the toilet 164 is located substantially at the apex of the compartment 160. This arrangement is considered to make efficient use of the space available—having the toilet 164 located at the apex of a substantially triangular compartment 160 reduces the amount of "wasted" space at either side of the toilet 164. A passenger (not shown) using the lavatory 160 benefits from the more efficient use of space as an impression is given of being in a relatively large compartment, even though the size of the compartment 160 may not, in fact, be greater than that of a conventional rectangular compartment (not shown) provided to fit the space 130.

In order to provide passengers (not shown) seated in rows facing a bulkhead with facilities otherwise provided by the seat in front, it is preferred to provide these facilities on the bulkhead itself. In the present embodiment, the rear of a seat normally provides a passenger in the seat behind with facilities in the form of a tray, stowage compartment and monitor, and may also provide facilities such as cup holders, telephones, coat hooks, and the like. Referring to FIG. 6 by way of example, passengers seated in row 141 face a bulkhead in the form of compartment wall 162. It is preferred to provide respective facilities, such as a tray, a stowage compartment and a monitor (not illustrated in FIG. 6), on the wall 162 in alignment with and facing the respective seat in row 141. It is further preferred, therefore, that the wall 162 is inclined, with respect to the longitudinal axis, at substantially the same angle as the row 141. It is also preferred that the spacing or pitch between the wall 162 and the seats in row 141 is substantially the same as the distance or pitch between seats in adjacent rows.

Similarly, any space (usually substantially triangular in shape) formed between a group of seats embodying the invention and, say, a bulkhead or another group of seats, may be filled with one or more stowage compartments (not shown), one or more passenger seats or cabin crew seats (not shown), a lavatory or other compartment (not shown).

The invention is not limited to the embodiments described herein which may be modified or varied without departing from the scope of the invention.

What is claimed is:

1. A seating arrangement for a vehicle, the seating arrangement comprising seats arranged in a row, said seats having at least one armrest, wherein adjacent seats in said row are staggered in a first direction and overlap in a second direction, the second direction being substantially perpendicular to said first direction, to an extent that at least one of said at least one armrests of a first seat overlaps with and projects beyond a respective one of said armrests of a respective adjacent seat in said second direction.

2. A seating arrangement as claimed in claim 1, wherein said seats are arranged in a plurality of generally parallel ranks, each rank extending in said first direction, and in a plurality of rows, each row extending at an angle other than a right angle with respect to said first direction.

3. A seating arrangement as claimed in claim 2, wherein the angle between the row and said first direction is between 40° and 80.

4. A seating arrangement as claimed in claim 3, wherein the angle between the rows and said first direction is between 50° and 70°.

5. A seating arrangement as claimed in claim 4, the angle between the rows and said first direction is between 60° and 62°.

6. A seating arrangement as claimed in claim 2, wherein the ranks are arranged in groups and at least some of the groups that are adjacent in said first direction are arranged such that their respective rows are disposed at supplementary angles with respect to said first direction thereby defining a substantially triangular space between said at least some adjacent groups.

7. A seating arrangement as claimed in claim 6, wherein a walled compartment is provided in a space defined between said adjacent groups.

8. A seating arrangement as claimed in claim 7, wherein said compartment is substantially triangular in shape and comprises a toilet located substantially at a apex of the compartment.

9. A seating arrangement as claimed in claim 8, wherein each seat has a back and a base, in which at least the back of the seat can be moved from a relatively upright position to a relatively reclined position, in which movement of the seat from the upright to the reclined position involves forward movement of the seat base such that the back of the seat does not move in a rearwards direction at a level below the armrest of the seat.

10. A seating arrangement as claimed in claim 9, wherein, during movement of the seat from the upright to the reclined position, the back of the seat is arranged to pivot about an axis extending in said second direction at a level at or above the level of the armrest of the seat.

11. A seating arrangement as claimed in claim 1, wherein said first direction is the direction in which at least some of said seats face.

12. A seating arrangement as claimed in claim 1, in which the seats in said row overlap in said direction in which at least some of said seats face.

13. A seating arrangement as claimed in claim 12, wherein at least some of said seats have a first armrest located at a first side of said seat and a second armrest located at a second opposite side of said seat, one of said first and second armrests of at least one of the seats in a row is truncated in length with respect to the other of said first and second armrest to fit behind an adjacent seat.

14. A seating arrangement as claimed in claim 13, wherein said truncated armrest is arranged to substantially abut with the rear of an adjacent seat.

15. A seating arrangement as claimed in claim 12, wherein one of said at least one armrests of at least one of said seats projects from the rear of the seat defining a gap underneath, and wherein part of a seat pan of an adjacent seat is located in said gap beneath said one armrest.

16. A seating arrangement as claimed in claim 1, wherein the amount of overlap of adjacent seats in said second direction is approximately equal to the combined widths, in said second direction, of said at least one armrest of said first seat and said respective one armrest of said adjacent seat.

17. A passenger conveyance comprising a seating arrangement comprising seats arranged in a row, said seats having at least one armrest, wherein adjacent seats in said row are staggered in a first direction and overlap in a second direction, the second direction being substantially perpendicular to said first direction, to an extent that at least one of said at least one armrests of a first seat overlaps with and projects beyond a respective one of said at least one armrests of an adjacent seat in said second direction.

18. A passenger conveyance as claimed in claim 17, wherein the conveyance comprises an aircraft.

19. A seating arrangement as claimed in claim 1, wherein each seat includes a seat pan, said at least one of said at least one armrests of said first seat overlapping in said second direction with the seat pan of said adjacent seat, and said respective one armrest of said adjacent seat overlapping in said second direction with the seat pan of said first seat.

20. A seating arrangement as claimed in claim 1, wherein each seat includes a seat pan, and wherein part of the seat pan of said first seat is located beneath one of said armrests of said adjacent seat.

21. A seating arrangement for a vehicle, the seating arrangement comprising seats arranged in a row, said seats having a seat pan and at least one armrest, wherein adjacent seats in said row are staggered in a first direction, and overlap in a second direction, the second direction being substantially perpendicular to said first direction, wherein at least one of said at least one armrests of a first seat overlaps in said second direction with the seat pan of a respective adjacent seat.

22. A seating arrangement as claimed in claim 21, wherein one of said at least one armrests of said respective adjacent seat overlaps in said second direction with the seat pan of said first seat.

23. A seating arrangement as claimed in claim 21, wherein part of the seat pan of said respective adjacent seat is located beneath said at least one of said at least one armrests of said first seat.

* * * * *